United States Patent
Sanford

(10) Patent No.: US 7,032,529 B2
(45) Date of Patent: Apr. 25, 2006

(54) SHOCK ABSORBING LINE DEVICE

(76) Inventor: Eric Sanford, P.O. Box 1300, Hood River, OR (US) 97031

( * ) Notice: Subject to any disclaimer, the term of this patent is extended or adjusted under 35 U.S.C. 154(b) by 0 days.

(21) Appl. No.: 10/924,438

(22) Filed: Aug. 23, 2004

(65) Prior Publication Data

US 2005/0039668 A1    Feb. 24, 2005

Related U.S. Application Data

(60) Provisional application No. 60/481,280, filed on Aug. 23, 2003.

(51) Int. Cl.
*B63B 21/00*    (2006.01)

(52) U.S. Cl. .................... 114/230.2; 224/251; 482/121

(58) Field of Classification Search ............. 114/230.1, 114/230.2, 251, 343; 482/121, 122, 124, 482/126; 441/84; 224/250, 251, 254
See application file for complete search history.

(56) References Cited

U.S. PATENT DOCUMENTS

| | | | | | |
|---|---|---|---|---|---|
| 4,597,351 | A | * | 7/1986 | Brainard, II | 267/74 |
| 5,205,803 | A | * | 4/1993 | Zemitis | 482/121 |
| 5,797,167 | A | * | 8/1998 | Schwab | 24/16 R |
| 6,776,317 | B1 | * | 8/2004 | Parker | 224/251 |
| 6,800,007 | B1 | * | 10/2004 | Calkin | 441/84 |

* cited by examiner

*Primary Examiner*—Lars A. Olson

(57) ABSTRACT

A shock absorbing line device that preferably comprises one or more loops of shock cord protected by one or more lengths of tubular webbing with carabiners secured to either end.

11 Claims, 4 Drawing Sheets

SHOCK ABSORBING LINE DEVICE

This application claims the benefit of Provisional Application No. 60/481,280, filed Aug. 23, 2003.

FIELD OF THE PRESENT INVENTION

The present invention relates generally devices for securing to objects together. More particularly, the invention relates to flexible devices for securing objects that are capable of absorbing forces tending to separate the objects.

BACKGROUND ART

A common method for securing objects together comprises a simple line or rope. While this has the advantage of being flexible and adaptable, there are situations where such methods have undesirable characteristics.

For example, it is often advantageous to provide a device that is compliant or elastic. Such a device can provide tension between the two objects even when the distance between them changes. In contrast, a simple rope becomes slack once the distance between the objects decreases. Further, the use of an elastic device offers the ability to absorb force or shock as the objects are moved apart.

The lack of these features is often exacerbated when the objects being secured are able to move independently of each other. When a rope is used, it becomes slack as the objects move together and allows the objects to move apart without resistance until the slack is taken up, at which point it becomes taut and rapidly transmits force and shock to the objects. When sufficient forces are involved, this can result in substantial jarring.

Attempts to address these deficiencies include the use of elastic line. However, tying knots in elastic line can be difficult. Further, elastic lines often exhibit reduced breaking strength as compared to non-elastic lines.

One prior art improvement on a simple rope is the bungee cord. Such devices typically comprise an elastic cord having hooks at either end. While convenient, bungee cords have their own deficiencies. For example, the hooks typically offer a secure means of attachment only when there is tension applied to the cord. Once the cord becomes slack, it is relatively easy for the hook to become disengaged. Further, typical bungee cords are not often built to handle significant stresses. As users of such devices are aware, the elastic cord often fails and the hooks deform.

Accordingly, what has been needed is a device to reliably secure objects together. There is also a need for such a device that is flexible and can absorb shock or maintain tension between the secured objects. This invention satisfies these and other needs.

SUMMARY OF THE INVENTION

In accordance with the above objects and those that will be mentioned and will become apparent below,

DETAILED DESCRIPTION OF THE INVENTION

It is to be understood that the terminology used herein is for the purpose of describing particular embodiments of the invention only and is not intended to be limiting.

Unless defined otherwise, all technical and scientific terms used herein have the same meaning as commonly understood by one having ordinary skill in the art to which the invention pertains.

Further, all publications, patents and patent applications cited herein, whether supra or infra, are hereby incorporated by reference in their entirety.

Finally, as used in this specification and the appended claims, the singular forms "a", "an" and "the" include plural referents unless the content clearly dictates otherwise.

This invention comprises a device for attaching two objects together. The device is a flexible member that has shock absorbing qualities. The invention generally comprises an inner resilient component having opposing ends to which attachment devices can be secured. The inner resilient component may have a flexible protector covering one or more portions of the inner resilient component. In some embodiments, the invention further comprises an internal limiting member secured to the attachment devices.

In a preferred embodiment, the inner resilient member comprises one or more loops of shock cord, the attachment devices comprise carabiners or other clips and the flexible protector comprises tubular webbing. Specifically, a proper length of shock cord is determined by measuring the final desired length of the product and adding sufficient length to allow for securing the ends of the shock cord. For example, when a knot is used to secure the ends of the shock cord, twelve inches is generally suitable to allow for knotting and excess ends. In embodiments comprising an internal limiting member, the limit member controls the overall extension of the device.

Currently preferred lengths of the shock absorbing line device are twelve inches, eighteen inches and twenty-four inches. However, one will recognize that any suitable length can be used. In general, the greater the length of the device, the greater the amount of shock absorbing travel.

Figure 1:
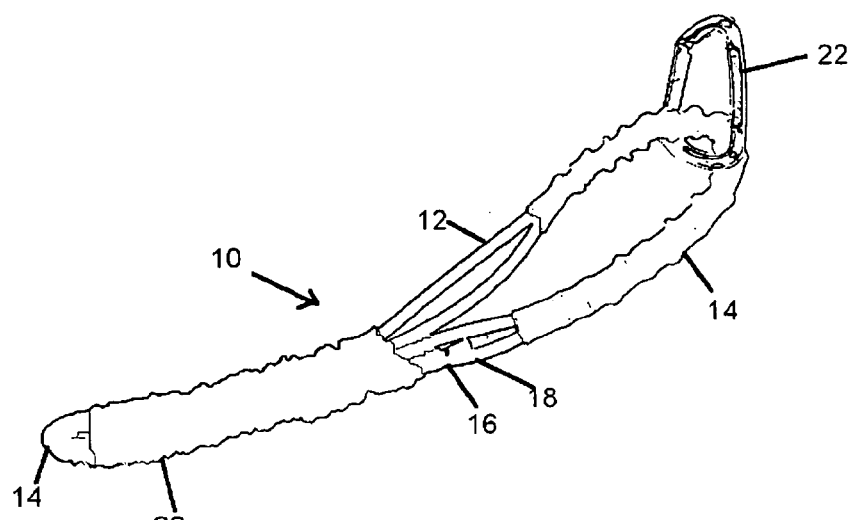
FIG. 1 is a schematic view showing internal components of a shock-absorbing line device of the invention.
Figure 2:
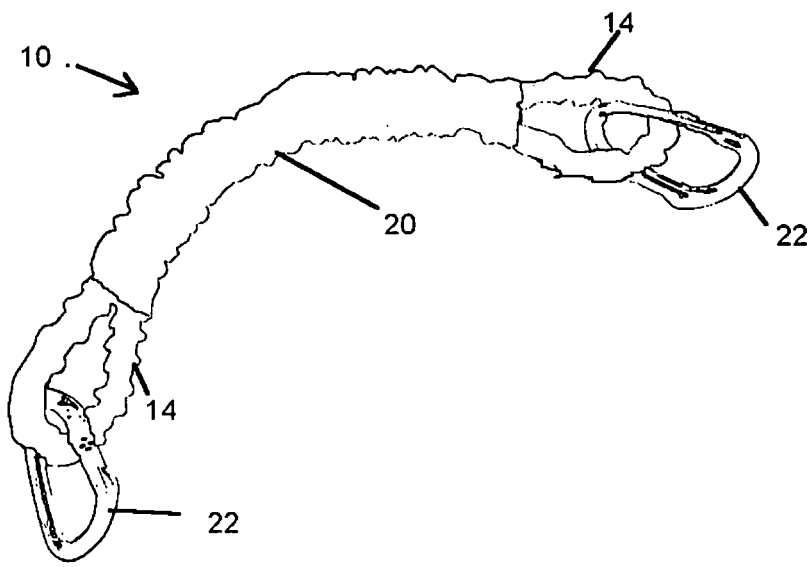
FIG. 2 is schematic view of the embodiment of the invention shown in FIG. 1.

As shown in FIGS. 1 and 2, the shock absorbing line device 10 comprises looped shock cord 12. The shock cord is fed through two tubular webbing covers 14 and secured by knot 16. The configuration shown comprises two loops of shock cord 12. The loose ends of shock cord 12 may also be secured by hog rings 18. The assembly is fed through tubular webbing 20, and carabiners 22 attached to the exposed ends.

Preferably, the shock cord is wrapped with approximately two wraps of adhesive tape at the cutting point so that the outer covering will not fray when cut. Shock cord is then cut with a razor knife or other suitable means. One end of the resulting piece of shock cord is fed into a length of one inch tubular nylon webbing which is approximately the length of the desired length of the finished product plus one inch, having been cut and the ends melted so that they will not unravel and so that the inside of the webbing is accessible. The shock cord is then fed into a second similar piece of tubular nylon webbing so that the webbing is covering a portion of the shock cord. One end of the shock cord is then again fed through the one inch webbing in such a manner that it follows the original path through the webbing until one end of the shock cord meets the other in a parallel direction. The ends are then connected by any suitable means. For example, adhesives or sewing can be used to secure the ends.

A currently preferred means of attaching the shock cord ends comprise knotting, using, for example a "grapevine knot" or "fisherman's bend" whereby one end forms an overhand knot, the other end is drawn through the resulting opening in this knot going in the opposite direction and tied into a duplicate overhand knot around the first shock cord end leaving one inch of loose end protruding on either side of the finished knot. Preferred knots become more secure when pressure is applied to each end of the device. The ends of the knot are grabbed with pliers and pulled until the knot is "set" and the resulting knot is of a diameter not greater than three times the diameter of a single strand of shock cord.

Both loose ends of the shock cord are fastened securely onto the main body of the loops by any suitable means. A currently preferred means comprises the use of stainless "hog rings" which are crimped so that the ends will not slip. Other means of attachment include adhesives and sewing. The resulting set of two loops is flattened and positioned so that the knot is in the middle of the resulting loop, and fed into a length of two inch tubular nylon webbing which is approximately twice the length of the desired length of the finished product so that the ends, covered by the one inch tubular webbing, are protruding from each end.

The length of the tubular webbing allows the internal shock cord to remain covered with protective tubular webbing even when fully stretched. One end may be fastened to a static object and the other end stretched until the length of the product is twice its unstretched length, then slowly released so that the two inch tubular webbing cover is evenly distributed in a gathered position over the internal shock cord. An anodized aluminum carabiner may then be attached to each end.

Presently preferred materials include 5/16 inch nylon coated shock cord used as a stretchable internal member which will stretch to twice it's original length. Two inch tubular nylon webbing used as a protective covering over the main body of the shock cord assembly and one inch tubular nylon webbing used as a protective covering over the looped ends of the shock cord assembly. A 5/16 inch 16 gauge stainless steel hog ring is used to secure the ends of the shock cord, keeping the ends secure so that they will not untie from the knot used to secure them. Adhesive tape is wrapped around the ends of the shock cord to keep the outer nylon covering from unraveling. Aluminum 3 3/8 inch I.D. D shaped carabiners, anodized to protect them from salt water corrosion, with a breaking strength of 5,000#, can be placed on each end. Using these materials as described above will result in a shock absorbing line device capable of at least 1200 pounds breaking strength.

As one of skill in the art will recognize, these materials may be easily substituted to tailor the characteristics of the shock absorbing line device. For example, greater diameter or less diameter shock cord can be used to tailor the strength and shock absorbing qualities. Also, more than one loop of shock cord could also be used to increase the resilience and strength of the device, such as the embodiment shown in FIG. 2. Increasing the number of loops allows control over the shock absorbing line device's characteristics.

A presently preferred use for the shock absorbing line device of the invention is on the preventer of a sailboat. The crossover of the boom is traditionally initiated by a rudder controlled change in the sailing direction of the boat, and by hauling and subsequent releasing of the sheeting arrangement to force the boom over the centerline of the boat. Depending on the boat and the conditions, the crossover of the boom can be very sudden and violent, especially because dangerous boom velocities may be reached around the centerline when jibing in strong winds or rough sea conditions. Thus, unintentional jibes pose an obvious hazard to the sailors and the boat itself. A well known preventer system comprises a fixed line arrangement attached to the boom, and which runs forward to a safe attachment point on the boat, so that the boom is kept fixed at that perpendicular position in question. Although a conventional preventer can help avoid the dangers of boom movement during unintentional jibes, it is unsatisfactory in a number of ways.

Primarily, once the slack in the preventer is taken up, all the energy represented by the movement of the boom is suddenly translated to the preventer and therefore to the boat. Over time bolts, cleats, shackles, lines, blocks, chain and pulleys can weaken and break due to continuous shock loading while in use. The shock absorbing line device of the invention can prevent these results. It also greatly quiets the system.

Figure 4:
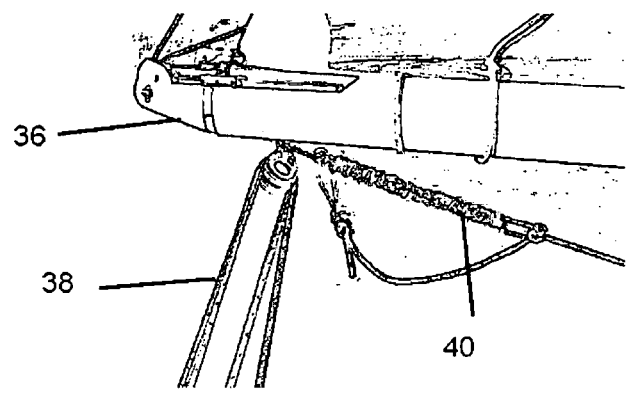
FIG. 4 is a partial perspective view of a shock-absorbing line device of the invention employed on sail boat preventer.
Figure 3:
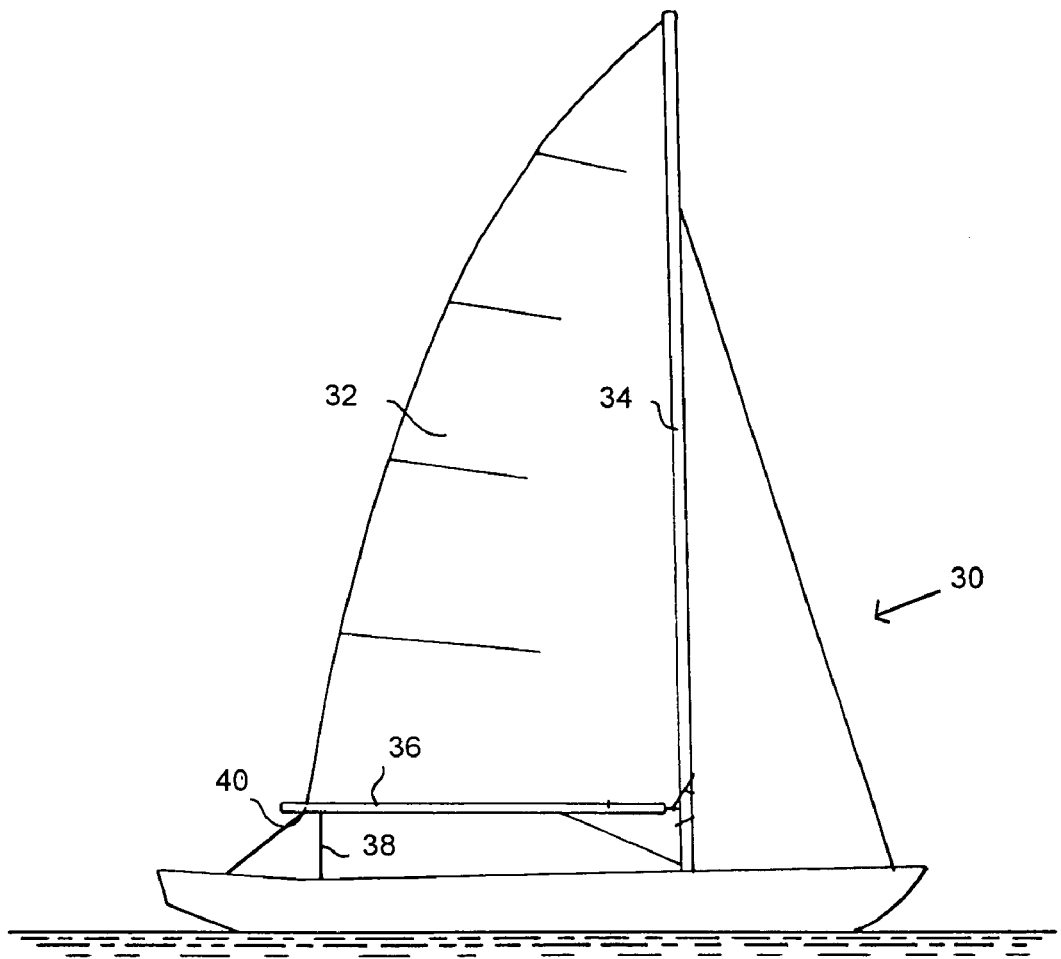
FIG. 3 is a schematic view of a sail boat having a shock-absorbing line device of the invention.

FIGS. 3 and 4 show the use of the shock absorbing line device of the invention being used on the preventer of a sailboat. The sailboat 30 generally comprises a mainsail 32, which is hoisted on a mast 34 and is fixed to a boom 36. The boom 36 has an outer free end connected to the boat 30 via a sheeting arrangement 38. A preventer 40 restrains the motion of the boom 36. By this traditional arrangement the boom is allowed to approach an angle of up until approximately 90 degrees to the centerline of the boat.

Figure 5:
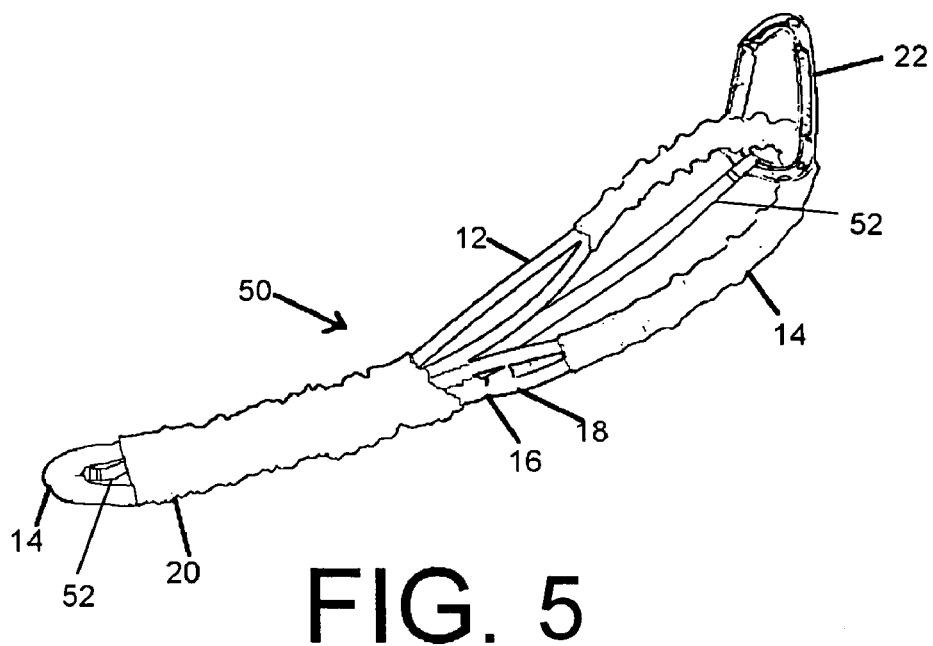
FIG. 5 is a schematic view of an alternative embodiment of a shock-absorbing line device of the invention.

An alternative embodiment of the invention is shown in FIG. 5. A shock absorbing line device 50 comprises looped shock cord 12. The shock cord is fed through two tubular webbing covers 14 and secured by knot 16. The configuration shown comprises two loops of shock cord 12. The loose ends of shock cord 12 may also be secured by hog rings 18. The assembly is fed through tubular webbing 20, and carabiners 22 looped through the exposed ends. Line device 50 further comprises an internal limiting member 52. As shown, limit member 52 is also looped through carabiners 22 and routed inside tubular webbing 20. Limit member can comprise any suitable relatively non-compliant, flexible and strong material, such as tubular or flat webbing, line, cord, rope or the like. This configuration provides an additional strength element to device 50 and also allows it to be designed with a maximum extension as desired.

Figure 6:
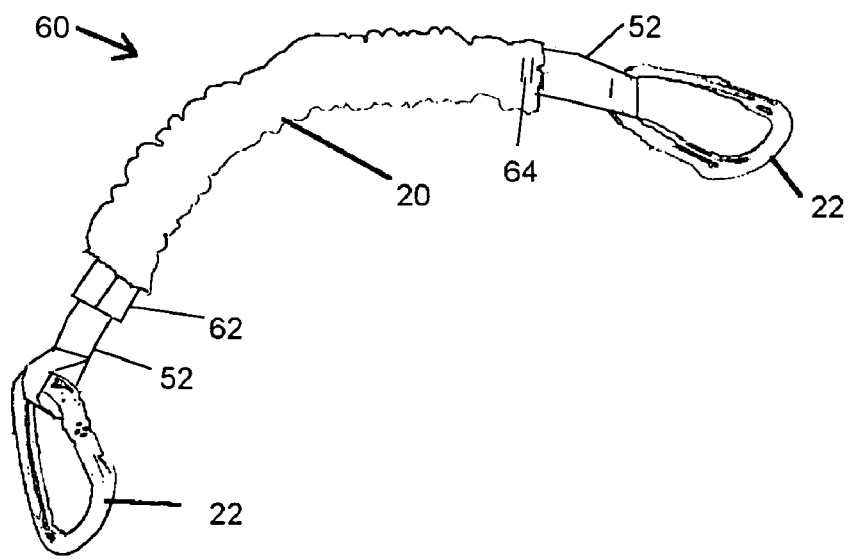
FIG. 6 is a schematic view of another alternative embodiment of a shock-absorbing line device of the invention.

Yet another embodiment is shown in FIG. 6. This line device 60 is similar to the embodiment shown in FIG. 5, except the internal webbing covers are omitted. As such, device 60 comprises internal resilient member 62, which can be one or more strands, looped or not, of suitably sized shock cord. Internal resilient member 62 is secured at either to internal limiting member 52. Carabiners 22 are likewise secured to either end of limit member 52. Internal resilient member 62 and limit member 52 are routed through outer tubular webbing 20 to provide UV and abrasion protection. Preferably, outer tubular webbing 20 is secured to limit member 52 or resilient member 62, such as by bar tacking 64, to maintain its position. In such embodiments, limit member 52 is preferably sized so that it becomes taut before outer tubular webbing 20 so that limit member 52 controls the overall extension of line device 60. For purposes of clarity, FIG. 6 shows the end opposite bar tacking 64 with tubular webbing 20 pushed back to expose limit member 52 and resilient member 62.

The shock absorbing line device of the invention is suitable for use in any situation where it is desirable to secure objects to one another, while maintaining tension or providing shock absorption.

For example, uses on a boat include securing the boom to the boat at rest for reducing noise and for allowing the mainsheet to be loosened to relieve stress on the sheet and boom. The shock absorbing line device can be used between a tow line and a dinghy to prevent the line from snapping taut to reduce the stress on the cleat, tow line and dinghy. Stress on the anchor and boat can be prevented and noise reduced by rigging a shock absorbing line device on the anchor chain. The device can also be used on the mooring line, the spinnaker tack, the tiller lash, the jibsheet rigging to obtain the same advantages in stress and noise reduction and sail trim.

In another application, the shock absorbing line device can be dimensioned to restrain and allow convenient use of a power hand tool, such as a rechargeable drill. By securing one end of the shock absorbing line device to the tool and the other end to the user, the tool can be used as normal. However, if the tool is dropped, the shock absorbing line device prevents it from striking the ground to protect it from damage.

Yet another application of the shock absorbing line device is for restraining a pet. By attaching the one end of the shock absorbing line device to a pet's collar and the other to a fixed object, the pet is controlled and any risk of injury is reduced by the shock absorbing qualities of the invention. Such embodiments can further comprise a handle at one end to allow convenient use as a leash, as well.

In general, the device of the invention can be used:

As a shock absorbing element whenever a static and movable object are attached to each other.

As a shock absorbing element whenever two movable objects are attached to each other.

As a shock absorbing element between two boats.

As a shock absorbing element between two cars.

As a shock absorbing element which is attached to the center portion of a rope, chain or cable so that a length of the rope, chain or cable is fixed between the carabiners is greater than the length of the line device.

As a shock absorbing element between the boom on a sailboat and a line which is rigged forward on the boat to prevent the boom from accidentally swinging in a large arc.

As a shock absorbing element rigged from the boom of a sailboat in order to fasten the boom end to the deck of the boat so that it will not swing freely.

As a shock absorbing element rigged on the side of a sailboat to which a line attaching a sail is lead so that there is no static load placed on the line, sail or attaching point on the boat.

As a shock absorbing element between the wings or fuselage of an airplane and any static point on the ground to which the airplane is attached.

As a shock absorbing element rigged between an anchor and anchor chain.

As a shock absorbing element between a boat and dockline.

As a shock absorbing element which is attached to one corner of a sail so that the shock of a strong wind load into the sail will not stress the seams, grommets or tie-down connection to the lines or deck of a boat.

The shock absorbing line device of the invention can be made to any length and is flexible so can go over and around corners and edges. The outer flexible protector covers the inner resilient component affording abrasion and ultraviolet resistance. Outer flexible covering can be removed to inspect the integrity of the internal resilient component. Aluminum carabiners provide lightweight yet very strong attachment, but other releasable removable attachment means are also suitable. Preferably, the carabiners or attachment devices allow attachment of the product in a secure fashion so that it will not accidentally detach when pressure is removed.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. A shock absorbing line device comprising an inner resilient component having opposing ends, attachment devices secured to the opposing ends, and a flexible protector covering one or more portions of the inner resilient component, and an internal limiting member secured to the attachment devices and routed within the flexible protector.

2. The line device of claim 1, wherein the inner resilient component comprises at least one loop of shock cord.

3. The line device of claim 2, wherein the flexible protector comprises tubular webbing.

4. The line device of claim 3, wherein the attachment devices comprise carabiners.

5. The line device of claim 2, further comprising an inner tubular member disposed over the shock cord and within the flexible protector.

6. The line device of claim 1, wherein the internal limiting member comprises nylon webbing.

7. The line device of claim 1, wherein the internal limiting member is configured to prevent extension of the inner resilient component beyond a desired amount.

8. A method for reducing shock between a first and second object comprising the steps of:
   providing a shock absorbing line device comprising an inner resilient component having opposing ends, attachment devices secured to the opposing ends, a flexible protector covering one or more portions of the inner resilient component, and an internal limiting member secured to the attachment devices and routed within the flexible protector; and
   securing a first end of the shock absorbing line device to the first object and a second end of the shock absorbing line device to the second object;
so that the amount of shock transmitted to the first and second object when they are moved away from each other is reduced.

9. The method of claim 8, wherein the first object comprises a sail boat boom.

10. The method of claim 8, wherein the first object comprises a pet.

11. The method of claim 8, wherein the first object comprises a hand tool.

* * * * *